Figure 1:
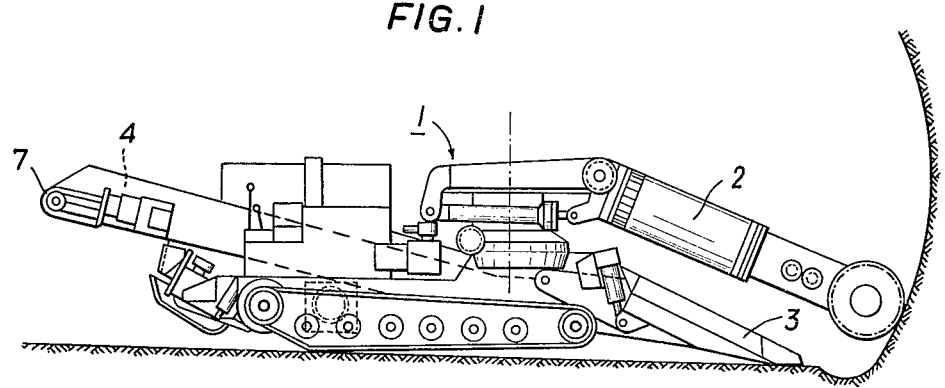

United States Patent [19]

Sigott et al.

[11] 4,236,627
[45] Dec. 2, 1980

[54] CUTTING MACHINE

[75] Inventors: Siegfried Sigott, Zeltweg; Peter Kogler, Knittelfeld; Otto Schetina; Alfred Zitz, both of Zeltweg, all of Austria

[73] Assignee: Vereinigte Österreichische Eisen-und Stahlwerke-Alpine Montan Aktiengesellschaft, Vienna, Austria

[21] Appl. No.: 719,157

[22] Filed: Aug. 31, 1976

[30] Foreign Application Priority Data

Sep. 2, 1975 [AT] Austria .................................. 6770/75

[51] Int. Cl.³ .............................................. B65G 65/02
[52] U.S. Cl. .................................... 198/514; 198/507; 198/856; 198/502
[58] Field of Search ................ 198/502, 505, 507, 514, 198/515, 573, 577, 856; 299/1, 18, 43–45, 56, 57, 64–67; 318/433, 434, 473

[56] References Cited

U.S. PATENT DOCUMENTS

| 1,306,064 | 6/1919 | Joy | 198/507 |
| 2,123,328 | 7/1938 | Cartlidge | 198/856 |
| 2,793,732 | 5/1957 | Russell | 198/507 |
| 3,845,375 | 10/1974 | Stiebel | 198/856 |
| 3,868,643 | 2/1975 | Bullivant | 198/505 |
| 3,972,429 | 8/1976 | Sigott et al. | 299/64 |

Primary Examiner—Joseph E. Valenza
Attorney, Agent, or Firm—Cushman, Darby & Cushman

[57] ABSTRACT

A cutting machine includes an endless conveyor and a loading ramp having movable loading arms which continuously shift the cut material in an upward direction of the loading ramp to conveyor. The rear deflector wheel of the conveyor is driven by a squirrel-cage motor, and the drive of the loading arms is, via the conveyor derived from the front deflector wheel. A slipper clutch is interpositioned within the drive between the motor and the loading arms, and the slide torque of the slipper clutch as reduced to the motor shaft, exceeds the breakdown torque of the squirrel-cage motor.

5 Claims, 4 Drawing Figures

CUTTING MACHINE

The present invention refers to a cutting machine comprising a conveying machinery formed of a belt conveyor or of a chain conveyor and a loading ramp having movable loading arms which continuously shift the cut material in upward direction of the loading ramp to the belt conveyor or the chain conveyor, noting that the rear deflector wheel of the conveyor belt or conveyor chain is driven by a squirrel-cage motor and that the drive of the loading arms is, via the conveyor belt or the conveyor chain, derived from the front deflector wheel.

Particularly with cutting machines of small height, as they are, for example, required in underground pit mining, it cannot be prevented that bigger lumps of cut material become jammed between the loading ramp and the cutting tool or at the area of transition from the loading ramp to the belt or chain conveyor. Such jamming may cause fracture of constructional parts and particularly may damage the drive means for the movable loading arms. By providing shear pins within the drive for the loading arms the risk of breakage of expensive parts of a drive can be reduced but the exchange of broken shear pins does cause considerable operating stoppage. There has already been proposed to provide slipper clutches, which slip in case of any overload while the drive motor is still operating. Such slipper clutches, however, require careful supervision because the clutch facings will burn out if the drive motor is not immediately stopped. It is known to use squirrel-cage motors in the drive unit for the chain or belt conveyor. Such squirrel-cage motors provide the advantage that they can be subjected for a short time to a load corresponding to their breakdown torque, and that they are shut off if the load exceeds the breakdown torque. However, in case of the above-mentioned jamming, the drive is subjected to the mass forces of the rotor even after the motor has been shut off, so that fractures of constructional parts can occur before the motor comes to a rest.

It is an object of the present invention to avoid the mentioned drawbacks of a cutting machine of the kind defined above, and the invention essentially consists in that a slipper clutch is interpositioned within the drive between the motor and the loading arms, and that the slide torque of said slipper clutch, as reduced to the motor shaft, exceeds the breakdown torque of the squirrel-cage motor. The slipper clutch allows to promptly make ineffective load peaks and the rotating masses of the rotor, whereas by providing a squirrel-cage motor and by adjusting the slide torque of the slipper clutch to a higher value than the breakdown torque of the motor, the motor is immediately shut off and the slipper clutch is prevented from being subjected to further stress, which might otherwise cause burning through of the clutch facing. In such an arrangement, supervision of any slip within the slipper clutch becomes superfluous. According to the invention, the slide torque of the slipper clutch is approximately 30% greater than the breakdown torque of the squirrel-cage motor, so that when surpassing the breakdown torque of the motor this motor will reliably shut down first, whereupon the slipper clutch will make ineffective the rotating masses for a short time interval.

According to a preferred embodiment, the slipper clutch is interpositioned between the rearward deflector wheel of the conveying machinery and the squirrel-cage motor so that also the drive means for the conveyor belt or chain and for the deflector wheels is protected from overload.

As a rule, electric motors are protected against thermal overload as a cause of too high a current input by means of bimetal protective switches. Such bimetal protective switches respond with some time lag, which provides the advantage that the energization of the motor will not be interrupted on short-lasting peak loads. However, when the motor becomes blocked, the motor will be sufficiently rapidly shut off, so that its windings will not be damaged. However, the motor can become excessively warmed up on frequently occuring shut-off operations for preventing overload, and, furthermore, the cooling time of the bimetal protective switch, only after the lapse of which cooling time the motor can again be energized, may be a disturbing factor particularly when any jamming of the cutting machine is remedied only by stopping the drive of the conveying machinery.

An improvement in this respect is provided by an embodiment of the invention, in which the squirrel-cage motor is combined with a revolution speed monitoring system which interrupts the electric energization of the motor if the revolution speed of the motor falls below that revolution speed which corresponds to the breakdown torque. Thus, in case of any blocking of a cutting machine, the squirrel-cage motor is, while the slipper clutch is slipping, de-energized within a range of revolution speeds extending between the revolution speed corresponding to the breakdown torque and complete rest of the motor, so that the motor, during the final part of the slowing time, will not exert any torque in addition to the fly-wheel moment. With this embodiment, the drive unit of the conveying machinery can be switched on immediately after the blocking of the cutting machine has been remedied.

In this embodiment, the revolution speed monitoring system preferably includes a non-contact revolution speed receiver having an electric metal sensor conveniently arranged near a rotating part of the drive, particularly the motor shaft, noting that on the circumference of the rotating part of the drive a protruding metal flap is fastened which skirts the metal sensor, and noting that the revolution speed monitoring system interrupts the electric energization of the motor if the impulse frequency of the signal delivered by the revolution speed receiver falls below a predetermined value. In view of the possibility to measure the revolution speed of the drive in a contact-free manner, the revolution speed monitoring system can be installed at any desired location and in any desired manner so that also existing machines can subsequently be equipped therewith.

The invention is further illustrated with reference to the drawing schematically showing an embodiment of the invention.

In the drawing

Figure 2:
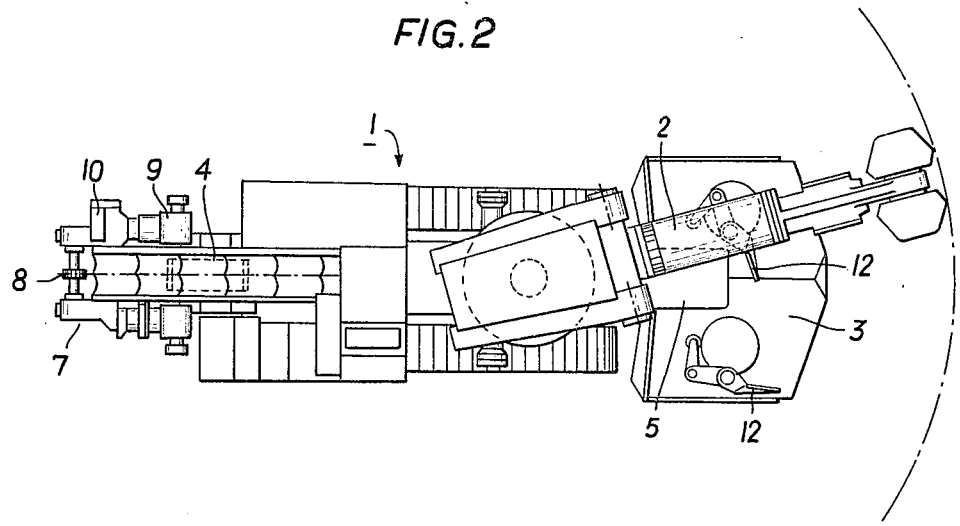
Figure 3:
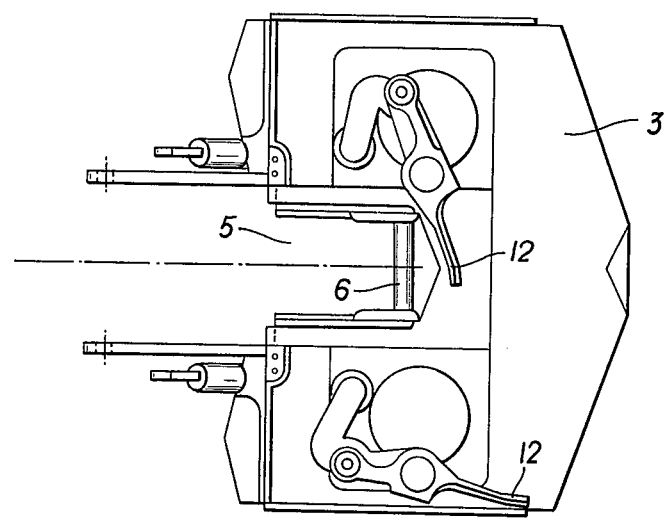
Figure 4:
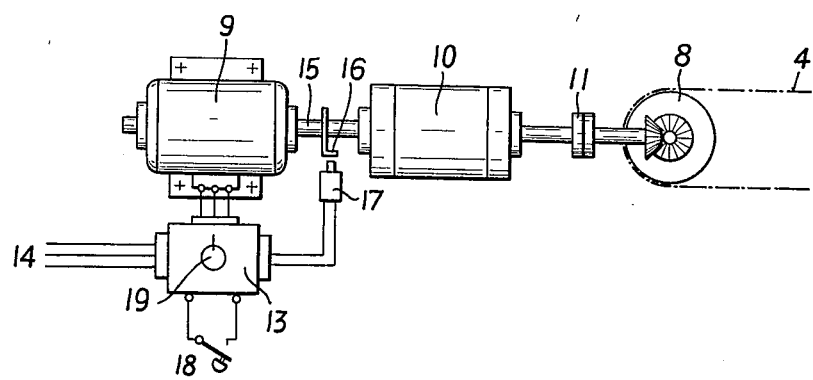

FIGS. 1 and 2 show a cutting machine in a side elevation and a top plan view, respectively, FIG. 3 a top plan view of the loading ramp with the loading arms and the forward deflector wheels of the chain conveyor, and FIG. 4 the conveyor drive of the cutting machine comprising a means for de-energizing the motor on overload and in dependence on the revolution speed.

The cutting machine 1 comprises a cutter boom 2, a loading ramp 3 and a chain conveyor 4. The chain conveyor 4 is extending up to a recess 5 of the loading ramp 3 where there is arranged the forward deflector wheel 6. At the rearward end 7, there is provided the rearward deflector wheel 8 of this chain conveyor, and this deflector wheel 8 is driven by means of a drive motor 9 with interposition of a gearing 10. Between the gearing 10 and the rearward deflector wheel 8 there is provided a slipper clutch 11. On the upper side of the loading ramp there are provided loading arms 12 which are called lobster claws in view of their shape. These loading arms 12 are being propelled from the forward deflector wheel 6 of the chain conveyor and are moved such that they convey the cut material in the direction of recess 5 of the loading ramp, where there is located the forward end of the chain conveyor.

The drawing shows that, particularly with the cutter boom 2 assuming a lower position, the space between the cutter boom 2 and the loading ramp 3 is restricted. If greater lumps are jammed within this space, the loading arm 12 becomes blocked, and if the driving force exceeds a certain value there exists the risk of fracture.

When attaining a predetermined drive torque, the motor is loaded with its breakdown torque, and the motor is de-energized with further increase of the torque. However, the rotating masses are still acting, but it is not possible to surpass the torque limited by the slipper clutch, so that there is no danger for the loading arms as well as for the drive of the chain conveyor. In view of the motor being de-energized, the slipper clutch is slipping for only a short time interval and thus protected from burning through.

The blocked squirrel-cage motor, which is still connected to the mains, draws a high current so that the bimetal protective switch for this motor does respond to de-energize the motor. This protective measure is sufficient when the cutting machine becomes blocked only after prolonged time intervals. However, the bimetal protective switch will shut off the motor only with some time delay, so that the motor will, while slowing down during a stopping procedure, provide, according to its torque-speed-characteristic, a torque coacting with the fly-wheel torque of the rotating masses, the result of which is that slowing down to stoppage does last longer than such a slowing down with prompt interruption of the electric energization. Furthermore, with frequently occuring blocking of the cutting machine, the squirrel-cage motor might be excessively warmed up and in addition, a bimetal protective switch requires, after a switching-off operation, a certain cooling time to assume a condition for being set for a new operating cycle.

These phenomena may be avoided if the squirrel-cage motor 9 is being still better protected by means of a revolution speed monitoring system as shown in FIG. 4, which monitoring system interrupts the electric energization of the motor, for which purpose three-phase alternating current is supplied via conduits 14, if the motor speed falls below a predetermined low speed of the motor, which does not occur on normal motor operation. For the mentioned purpose a protruding metal flap 16 is fixed to the shaft 15 connecting the motor and the gearing 10, which metal flap 16 skirts on each revolution of the shaft a stationarily arranged electric metal sensor 17 which on each skirting movement supplies one electric impulse. For example, if the shaft 15 rotates with a nominal speed of 900 rpm, the interval between two subsequent pulses amounts to approximately 67 milliseconds. The monitoring system can be designed and adjusted, respectively, such that a change in conditions is signalized if that interval exceeds 100 milliseconds correspoinding to a reduction in speed below 600 rpm.

The revolution speed monitoring system comprises a magnetic switch which provides the electric energization of the motor 9 in energized condition, but which is de-energized if the actual revolution speed of the motor falls below said mentioned predetermined revolution speed. For again energizing the motor 9, the magnetic switch must be energized by means of a discrepency switch 18 being designed as push button and being, if desired, connected to cancel optical or acoustic alarm signals. A positioning device 19 is provided for selecting the revolution speed to be monitored.

What we claim is:

1. A cutting machine comprising conveying machinery formed of an endless conveyor extending between a rear deflector wheel and a front deflector wheel; a loading ramp having movable loading arms which continuously shift the cut material in upward direction of the loading ramp to the conveyor, the rear deflector wheel of the conveyor being driven by a squirrel-cage motor and the drive of the loading arms being derived, via the conveyor from the front deflector wheel; a slipper clutch interpositioned within the drive between the motor and the loading arms, the slide torque of said slipper clutch, as reduced to the motor shaft exceeding, the breakdown torque of the squirrel-cage motor.

2. A cutting machine as in claim 1 wherein the slide torque of the slipper clutch is approximately 30% greater than the breakdown torque of the squirrel-cage motor.

3. A cutting machine as in claim 1 wherein the slipper clutch is interpositioned between the rearward deflector wheel of the conveying machinery and the squirrel-cage motor.

4. A cutting machine as in claim 1 wherein the squirrel-cage motor is combined with a revolution speed monitoring system which interrupts the electric energization of the motor if the revolution speed of the motor falls below that revolution speed which corresponds to the breakdown torque.

5. A cutting machine as in claim 4 wherein the revolution speed monitoring system includes a non-contact revolution speed receiver having an electric metal sensor arranged near a rotating part of the drive, which skirts the metal sensor, the revolution speed monitoring system interrupting the electric energization of the motor if the impulse frequency of the signal delivered by the revolution speed receiver falls below a predetermined value.

* * * * *